July 9, 1935.  D. A. ROW  2,007,771
COAL CUBING MACHINE
Filed May 25, 1934  3 Sheets-Sheet 1
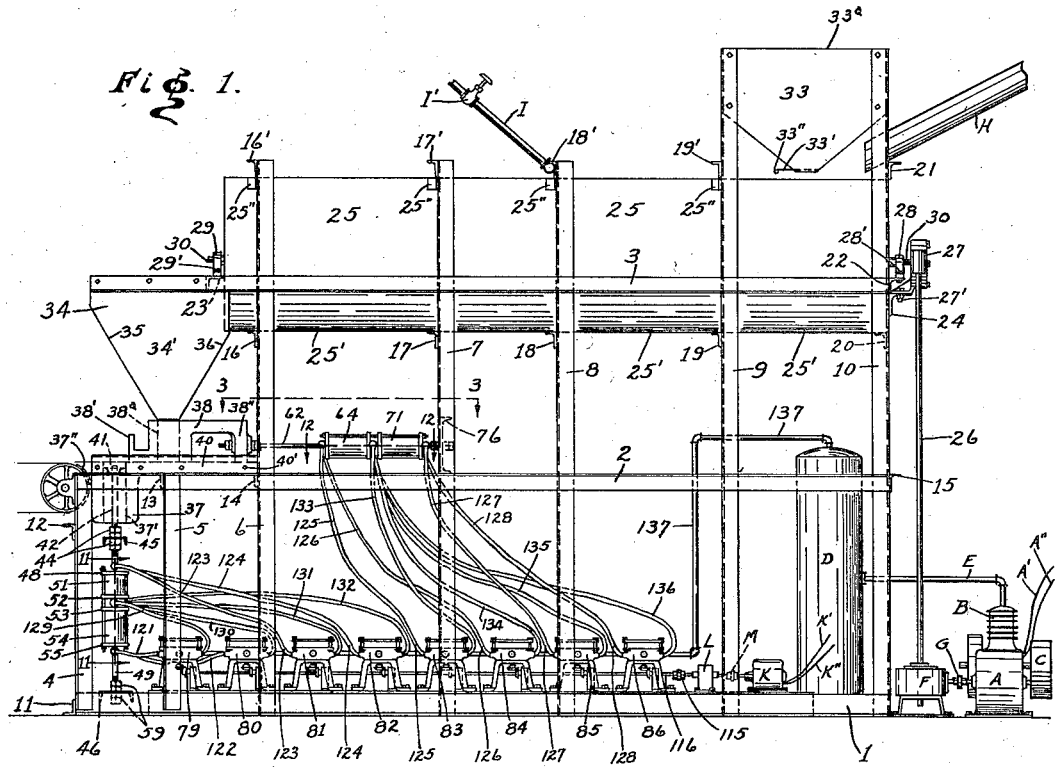
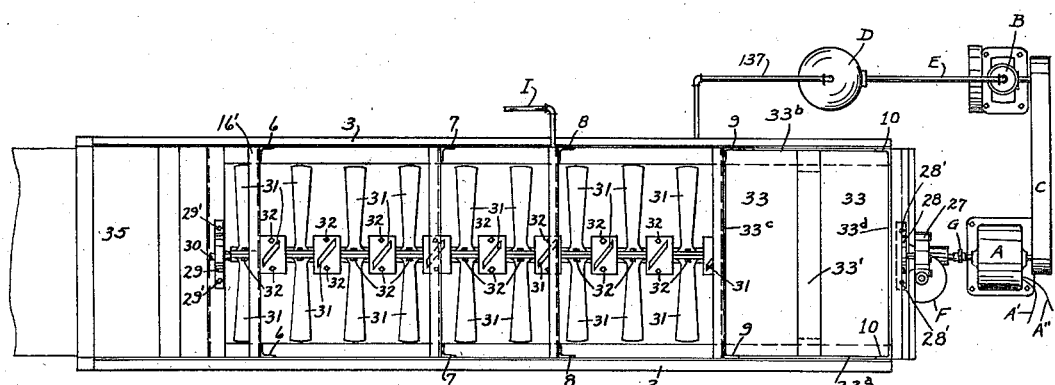
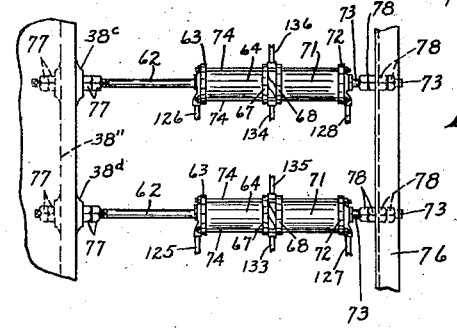
Inventor;
DANIEL A. ROW:
By
Donald E. Windle,
Attorney

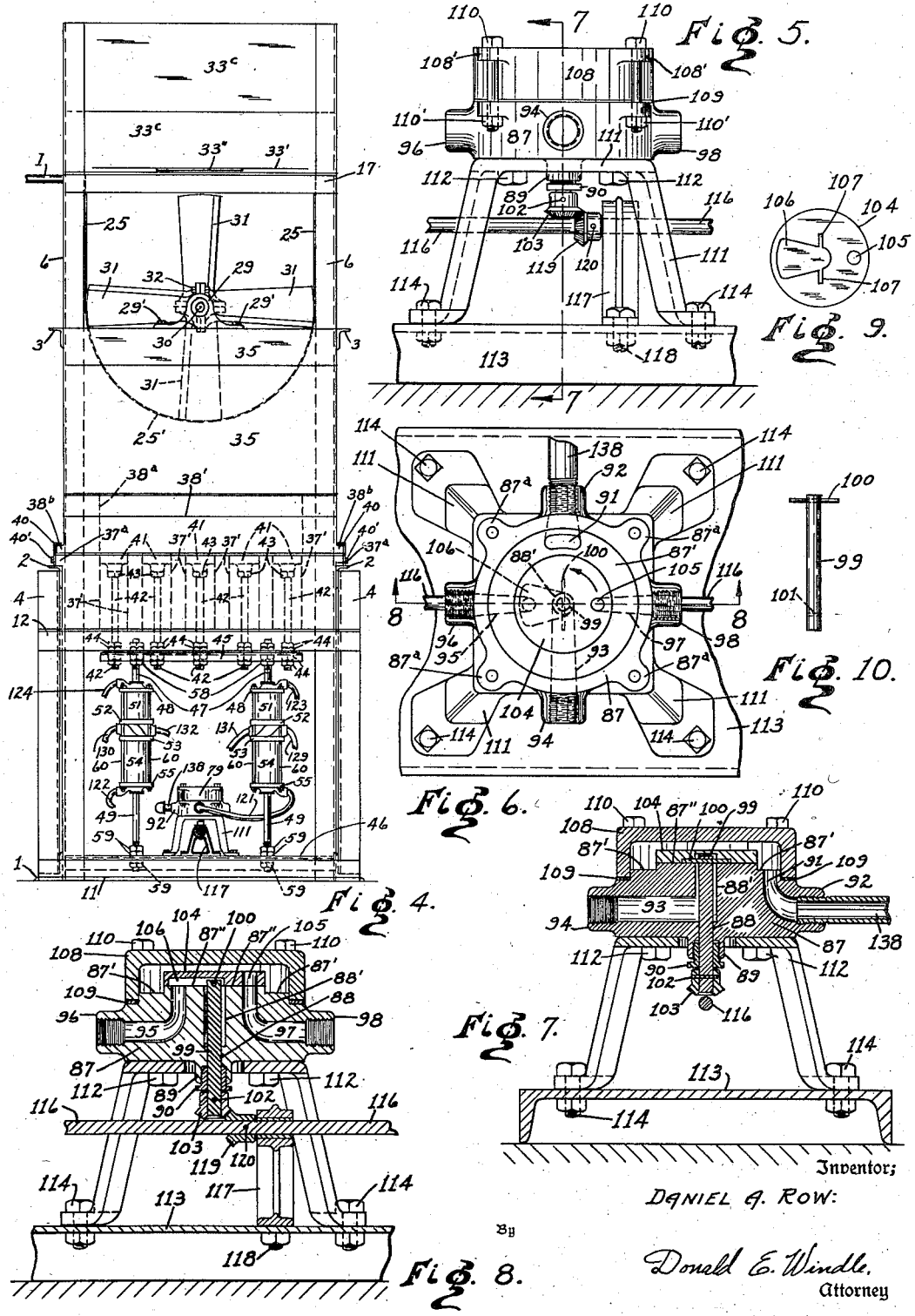

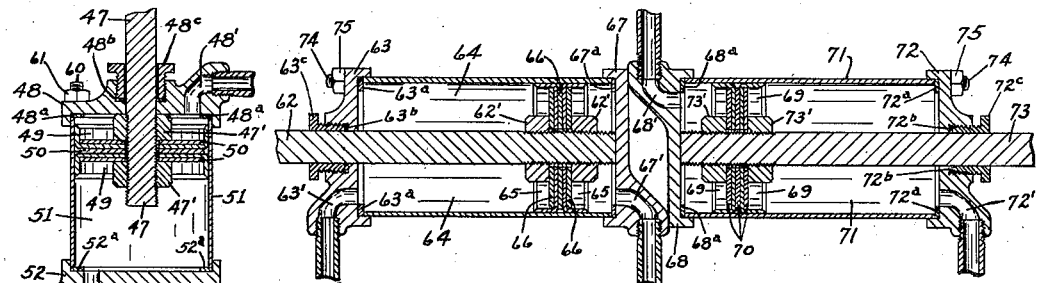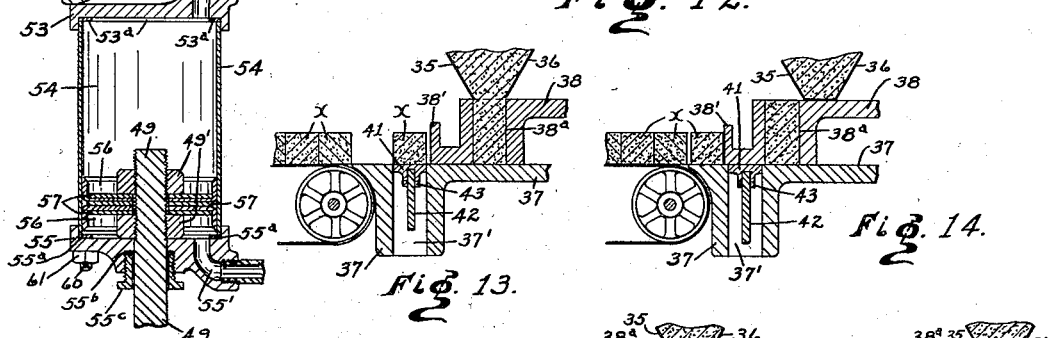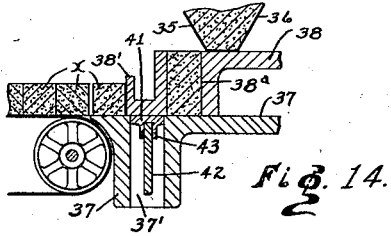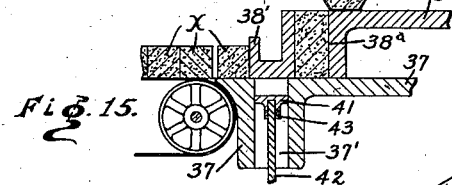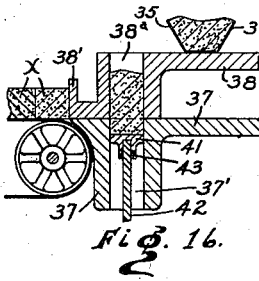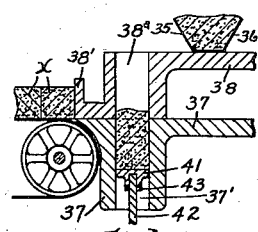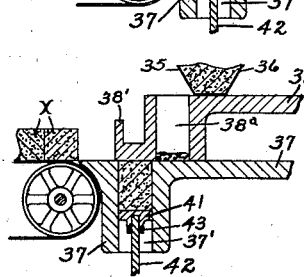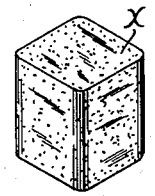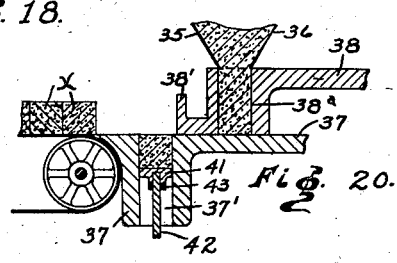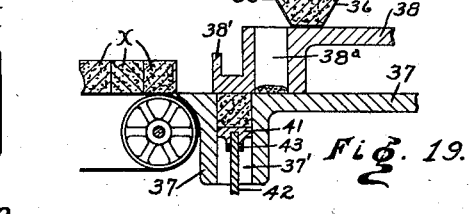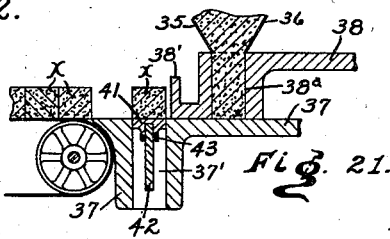

Patented July 9, 1935

2,007,771

UNITED STATES PATENT OFFICE 2,007,771

COAL CUBING MACHINE

Daniel A. Row, Richmond, Ind.

Application May 25, 1934, Serial No. 727,406

7 Claims. (Cl. 25—34)

One of the objects of my invention is the provision of a machine for mixing and pressing slack coal, or the like, into cube-shaped blocks.

Another object of my invention is the provision of a machine which will operate efficiently without the use of chain drives, or cams, such as are used on other machines which are used for this purpose.

Another object of my invention is the use of air or liquid as means for operating the cube forming members.

Another object of my invention is the provision of a machine which, when once started, and the mixtures properly adjusted, will be entirely automatic in its operations, regardless of the length of time that it is in operation.

Other objects and advantages of my invention will suggest themselves in the course of the following description, and that which is new will be correlated in the appended claims.

The most satisfactory manner of carrying out the principles of my invention in a practical, economical, comprehensive and efficient manner is shown in the accompanying three sheets of drawings, in which—

Figure 1 is a side elevation of my machine.

Figure 2 is a top plan view of the same.

Figure 3 is a top plan view of the horizontally positioned cylinders, as taken from the line 3—3 of Figure 1.

Figure 4 is a front elevation of my machine, with the conveyor detached therefrom.

Figure 5 is a detail elevation of one of the controlling valves.

Figure 6 is a top plan view of one of the controlling valves with its cover removed.

Figure 7 is a cross section through one of the controlling valves taken on line 7—7 of Figure 5.

Figure 8 is a cross section through one of the controlling valves taken on the line 8—8 of Figure 6.

Figure 9 is a detail view of the under side of one of the controlling valve discs.

Figure 10 is a detail view of one of the controlling valve shafts.

Figure 11 is a central vertical section through one of the vertical compound cylinders, as taken on line 11—11 of Figure 1.

Figure 12 is a central longitudinal section through one of the horizontal compound cylinders, as taken on the line 12—12 of Figure 1.

Figures 13, 14, 15, 16, 17, 18, 19, 20 and 21 are sections through the cube forming members, and showing the various positions which these members assume in the operation of my machine.

Figure 22 is an isometric view of one of the cubes.

Similar indices indicate like parts throughout the several views.

In order that the construction, the operation, and the advantages of my invention may be more fully understood and appreciated, I will now take up a detailed description thereof, in which I will set forth the same as fully and as comprehensively as I may.

In the drawings, letter A denotes an electric motor having a shaft extending outwardly therefrom at each side, and to which electric current is supplied through the wires A' and A''. B denotes an air compressing unit which has a shaft extending outwardly therefrom at each side, one end of said shaft having a flywheel secured thereto and the opposite end having a pulley secured thereto. The compressing unit being operated by a belt C, or other suitable means, extending from a pulley secured to one end of the projecting motor shaft, forces air into the air storage tank D through the conduit E. F is a gear reduction unit having a horizontally extending shaft and a vertically extending shaft, the horizontally extending shaft being connected to the motor shaft by a flanged coupling G. H denotes a feed pipe through which coal slack or the like is conducted from a bin (not shown) to the mixer of the machine. I denotes a water conducting pipe which extends from a supply line to the mixer. The pipe I extends horizontally across the top portion of the mixer, and has its lower surface perforated for the outlet of the water into the mixer, the water supply to the mixer being controlled by the valve I'. K denotes an electric motor having a horizontally extending shaft, and is supplied with electric current through the wires K' and K''. L denotes a speed reduction unit having a horizontal shaft extending therefrom at each end. The speed reduction unit being connected to the shaft of the motor K by the shaft coupling M.

The frame of my machine is comprised of the angular-shaped members 1, 2 and 3 extending horizontally and substantially the full length thereof, the angular-shaped members 4, 5, 6, 7, 8, 9 and 10 extending vertically from the members 1, and the angular-shaped members 11, 12, 13, 14, 15, 16 16', 17, 17', 18, 18', 19, 19', 20, 21, 22 23 and 24 are cross members which tie the two sides of the machine together. All of the angular-shaped frame members may be bolted, riveted, or welded together, thereby forming a substantially single unit when assembled.

The numeral 25 denotes the mixing trough which is preferably made of sheet metal and has a curved or semi-circular shaped bottom 25', the rear end of the mixing trough being closed and the forward end of same being open. The bottom portion 25' rests on the angular-shaped cross members 16, 17, 18, 19 and 20 of the frame structure. At the upper edges of the mixing trough 25, and welded thereto, are the angle clip members 25", which are bolted, riveted, or welded to the vertical angular-shaped frame members 6, 7, 8 and 9, and thereby rigidly securing the mixing trough 25 to the frame members.

Extending vertically from the speed reduction unit F is the shaft 26 which terminates at its upper end in the gear reduction unit 27. The gear reduction unit 27 being rigidly secured to the angular-shaped frame member 24 by the two bolts 27'. Resting on and secured to the upper surfaces of the angular-shaped frame members 22 and 23 are the bearing blocks 28 and 29 respectively, the bearing blocks 28 and 29 being secured to the frame members 22 and 23 by the bolts 28' and 29' respectively. Extending horizontally from the gear reduction unit 27, through the bearing block 28, through the mixer trough 25, and through the bearing block 29 is the shaft 30. The end portions of the shaft are turned down to a smaller diameter than the central portion of the shaft, thereby preventing end motions of the shaft through the bearing blocks 28 and 29. Clamped to the shaft 30 throughout its extent between the bearing blocks 28 and 29 are the mixing blades 31, said blades being held rigidly to the shaft 30 by the bolts 32. The outer portions of the mixing blades 31 are disposed at an angle in relation to their line of travel, thereby advancing the material being mixed toward the open or front end of the mixer trough. The alternate mixing blades 31 being secured to the shaft 30 so that they are in alignment with each other, and the intermediate blades 31 are at right angles thereto. All of the blades 31 are secured in position with relation to each other by means of keys and keyways in the usual manner.

The numeral 33 denotes a hopper for receiving the mineral binder which is mixed with the coal slack or the like. The hopper 33 is preferably made of sheet metal and is comprised of the two ends 33a and 33b and the two side members 33c and 33d. The end members 33a and 33b being cut angular-shaped near their lower edges and the side members 33c and 33d formed to conform to the contour of the end members 33a and 33b, and the end and side members being welded together. Located near the lower edge of the side member 33c is a longitudinal slot through which the slidable member 33' is located. The member 33' is preferably made of sheet metal with one edge of the same formed into the roll 33". The hopper 33 is rigidly secured to the vertical angular-shaped frame members 9 and 10 with bolts, rivets, or by welding.

The numeral 34 denotes a hopper, preferably made of sheet metal, for receiving the mixed material from the mixer 25, and is comprised of the end members 34' and the front and rear side members 35 and 36 respectively. The end members 34' are cut angular shaped as shown in Figure 1. The front side member 35 being formed to fit the contour of the front edges of the end members 34', said front side member 35 extending upwardly from the lower edges of the members 34' to the upper edges of the frame members 3. The rear side member 36 extends upwardly from the lower rear edges of the end members 34' to the under side of the mixer trough. The end members 34' and the front and rear side members 35 and 36 respectively are preferably welded together. The hopper 34 is secured at its upper end portions to the frame members 3 by means of bolts, rivets, or by welding.

The numeral 37 denotes the member in which the cubes are pressed. The member 37 is preferably of cast material with its major portion extending downwardly and having a plurality of apertures 37' formed vertically therethrough. Located at the forward edge of the member 37 is the concave surface 37" which is formed thusly to accommodate a conveyor. The upper portion of the member 37 extends rearwardly from the forward edge to the vertical frame member 6 and is supported at its edges by the frame members 2, and is also supported by the cross frame members 13 and 14, and is secured thereto by means of a plurality of cap screws which are inserted from the underside of the horizontal portions of the members 13 and 14.

The numeral 38 denotes the material carrying member which is preferably made of cast iron or the like, and is of substantially the same width as the member 37 on which it is slidably mounted. Projecting forwardly and then upwardly from the main portion thereof is the portion 38', the purpose of which will be hereinafter explained. At the rear end of the member 38, and formed integral therewith, is the downwardly disposed portion 38" which extends downwardly from the upper surface of the member 38 to near the upper surface of the member 37. Formed integrally with the portion 38" are the two bosses 38c and 38d having apertures formed therethrough, and the purpose of which will be hereinafter explained. The member 38 has the aperture 38a formed vertically therethrough, and said aperture is of sufficient length to coincide with the outer edges of the apertures 37' of the member 37. The aperture 38a is for the purpose of conveying the mixed material from the hopper 34 to the apertures 37' of the members 37, as will be more fully explained hereinafter. Located at the lower portions of the sides of the member 38 are the outwardly extending portions 38b. The member 38 is guided in its forward and rearward movements by the two angular-shaped members 40, each being secured, through its downwardly disposed leg, by the cap screws 40' to the sides of the member 37. The horizontally disposed legs of the members 40 extend inwardly over the extending portions 38b of the member 38, and thereby forming guides for the member 38 in its forward and rearward movements.

Slidably located in each of the apertures 37' are the plungers 41, whose outer peripheries conform to the shape of the apertures 37'. The plungers 41 have flat upper surfaces, and each plunger has a boss on its lower side with a threaded aperture formed therein and which extends upwardly into the plunger. Threaded into the threaded apertures of the plungers 41 are the plunger rods 42 which extend downwardly therefrom and through the channel-shaped member 45. The plunger rods 42 are rigidly held in the plungers by their threaded portions and secured therein by the lock nuts 43, and are held rigidly in the channel-shaped member 45 by the lock nuts 44.

Extending horizontally between the frame members 1 is the channel-shaped member 45 which is secured at its ends to the frame members 1 by welding.

Extending vertically between the channel-shaped members 45 and 46 are the compound cylinders, and being identical, the description of one will suffice for the other, a central vertical section of the same being shown in Figure 11. Extending downwardly from the channel-shaped member 45 is the piston rod 47 which is threaded at both its upper and lower ends and having its upper end secured in said channel-shaped member 45 by means of the lock nuts 58. Said piston rod 47 extends downwardly through the bushing 48$^c$, the gasket 48$^b$ and the cylinder head 48 and terminates inside the cylinder 51.

The upper portion of my vertical compound cylinder is comprised of the cylinder heads 48 and 52 spaced apart by the cylinder casing 51 and the washers 48$^a$ and 52$^a$. Secured to the lower end of the piston rod are the cupper leather washers 49 separated by a metal washer plate 50. Each of the leather washers has a metal washer plate 50 inside its cupped portion and against which the clamping nuts are tightened. The cylinder head 48 has an aperture 48' formed therethrough, said aperture 48' being threaded at its outer terminal for the reception of a threaded conduit. The cylinder head 48 also has an aperture centrally located therein which is threaded for the reception of the threaded portion of the bushing 48$^c$ which is threaded or tightened against the composition washer 48$^b$. The cylinder head 52 is similar to the cylinder head 48 except that it has no aperture therethrough for the reception of a piston rod. The cylinder head 52 having an aperture 52' formed therethrough and which is threaded at its outer terminal for the reception of a threaded conduit.

The lower portion of my vertical compound cylinder is similar to the upper portion except that the members thereof are reversed in relation thereto, i. e., the piston rod 49 enters the cylinder through the lower cylinder head 55 instead of the upper, the cylinder heads 53 and 55 having the apertures 53' and 55' respectively, similar to the apertures 48' and 52' of the cylinder heads 48 and 52 respectively. The piston rod 49 extends downwardly from inside the cylinder 54, through the centrally located aperture in the cylinder head 55, through the aperture in the gasket 55$^b$, thence through the bushing 55$^c$, with its lower end being threaded and extending through an aperture in the channel-shaped member 46, and is rigidly secured therethrough by the lock nuts 59. The members 48, 48$^a$, 51, 52, 52$^a$, 53, 53$^a$, 54, 55 and 55$^a$ are held in clamped relation with each other by means of the four rod-like bolts 60 and the nuts 61. Said rod-like bolts 60 extending through apertures formed for their reception through the cylinder heads 48, 52, 53 and 55.

Extending horizontally across the frame structure is the channel-shaped member 76 (shown by dotted lines in Figure 1). The member 76 is rigidly secured at its ends to the frame members 7 by means of bolts, rivets, or by welding.

Extending horizontally through the apertures in the bosses 38$^c$ and 38$^d$ and extending rearwardly therefrom are the piston rods 62 which are threaded at their forward ends and are rigidly secured through the member 38'' by the lock nuts 77.

Extending horizontally between the member 76 and the downwardly disposed portion 38'' of the member 38 are the horizontally disposed compound cylinders, and being identical with relation to each other, the description of one of said cylinders will suffice for the other, a horizontal longitudinal section of the same being shown in Figure 12.

Referring now to Figure 12, the piston rod 62 extends rearwardly from the member 38'' through the bushing 63$^c$, the gasket 63$^b$, and the cylinder head 63, and terminates insides the cylinder 64. The forward portion of my horizontal compound cylinder is comprised of the cylinder heads 63 and 67 spaced apart by the cylinder casing 64 and the washers 63$^a$ and 67$^a$. Secured to the rear end of the piston rod 62 are the cupped leather washers 65, the same being spaced apart by a metal plate 66. Each of the leather washers has a metal washer plate 66 inside its cupped portion, and against which the clamping nuts 62' are tightened. The cylinder head 63 has an aperture 63' formed therethrough, said aperture 63' being threaded at its outer terminal for the reception of a threaded conduit. The cylinder head 63 also has an aperture centrally located therein which is threaded for the reception of the threaded portion of the bushing 63$^c$, and which is tightened against the composition washer 63$^b$. The cylinder head 67 is similar to the cylinder head 63 except that it has no centrally located aperture therethrough for the reception of a piston rod. The cylinder head 67 having an aperture 67' formed therethrough, and which is threaded at its outer terminal for the reception of a threaded conduit.

The rearward portion of my horizontal compound cylinder is similar in construction to the forward portion, except that the members thereof are reversed in relation thereto, i. e., the piston rod 73 enters the cylinder through the rear cylinder head 72 instead of the forward end, the cylinder heads 68 and 72 having the apertures 68' and 72' respectively, similar to the apertures 63' and 67' of the cylinder heads 63 and 67 respectively. The piston rod extends rearwardly from inside the cylinder 71, through an aperture in the cylinder head 72, through an aperture in the gasket 72$^b$, thence through the bushing 72$^c$, with its rear end being threaded, and extending through an aperture in the channel-shaped member 76, and is rigidly secured therethrough by the lock nuts 78. The members 63, 63$^a$, 64, 67, 67$^a$, 68, 68$^a$, 71, 72 and 72$^a$ are held in clamped relation with each other by means of the four rod-like bolts 74, and the nuts 75. Said rod-like bolts 74 extending through apertures formed for their reception through the cylinder heads 63, 67, 68 and 72.

The operations of my compound cylinders are controlled by the valves 79, 80, 81, 82, 83, 84, 85 and 86. The valves being identical in construction with relation to each other, the description of one will suffice for the others, the construction thereof being shown in detail by Figures 5, 6, 7, 8, 9 and 10 of the drawings.

My valve is comprised of the main body member 87 having a centrally located aperture 88, whose portion 88' being of greater diameter than its lower portion, extending vertically therethrough and terminating at its lower end through the downwardly disposed portion 89, said portion 89 being internally threaded for the reception of the externally threaded bushing 90. The main body portion 87 having an inlet passage 91 formed therethrough, said passage 91 extending downwardly from the upper surface 87' of the member 87, and then extending outwardly through the outwardly projecting portion 92 which is internally threaded for the reception of an externally threaded inlet conduit. Extending horizontally and outwardly from the aperture 88' is the exhaust outlet passage 93 and terminating through the outwardly projecting portion 94 which is internally threaded for the reception of an externally threaded conduit, if desired.

The main body member 87 has a central portion 87'' which has a flat top and whose periphery is circular in shape. Extending downwardly through the upper surface of the portion 87'' is the passage 95 which extends downwardly and outwardly, terminating through the outwardly projecting portion 96 which is internally threaded for the reception of an externally threaded conduit, also extending downwardly through the portion 87'' is the passage 97 which extends downwardly therefrom, and then outwardly and terminates through the outwardly projecting portion 93 which like the portions 92, 94 and 96, is internally threaded for the reception of an externally threaded conduit. Projecting upwardly through the aperture 88 and its enlarged portion 88' is the shaft 99. The shaft 99 has an aperture through its upper portion in which the pin 100 is secured, the pin 100 extends outwardly at each side of the shaft 99. The shaft 99 also has an aperture 101 through its lower portion for the reception of a rivet 102. On the lower end of the shaft 99 is the miter gear 103 and is secured thereto by the said rivet 102. Resting on the upper surface of the portion 87' is the disc 104, (the under side of which is shown in Figure 9). The disc 104 having an aperture 105 therethrough which registers with the upper ends of the passages 95 and 97 when rotated by the pin 100 carried by the shaft 99. On the under side of the disc 104 is the aperture 106, the innermost portion of which registers with the aperture 88' of the main body member 87, and the outer portion of which is greatly enlarged with relation to the inner portion, and when being rotated, registers with the apertures formed by the passages 95 and 97. Extending outwardly from the inner portion of the aperture 106 are the channeled slots 107 which are adapted to receive the projecting portions of the pin 100. The aperture 106 and the channeled slots extend substantially half way through the disc 104. The cap portion 108 of my valve is circular in shape and registers with the periphery of the portion 87'. Said cap member 108 having outwardly extending lugs 108' and which have apertures formed vertically therethrough for the reception of the bolts 110 which extend downwardly therethrough and extend downwardly through similar apertures formed in the lugs 87ᵃ which are formed integrally with the main body portion 87. A gasket 109 is provided for sealing the joint between the main body member and the cap member 108 when the nuts 110' are turned onto the bolts 110.

My valves are supported by and secured to the pedestals 111 by means of the cap screws 112 which are inserted from the under side of the same through apertures provided therefor. The cap screws 112 are threaded into internally threaded apertures in the main body portion 87.

The pedestals 111 are secured to the channel-shaped member 113 by means of the bolts 114.

Extending forwardly and horizontally from the shaft coupling 115 is the shaft 116 which is supported by the bearing brackets 117. The bearing brackets 117 are secured to the channel-shaped member 113 by the bolts 118. Secured to the shaft 116 are the miter gears 119 by the pins or rivets 120. The miter gears 119 mesh with the similar miter gears 103.

The members 96 of the valves 79 and 80 are connected with the threaded apertures of the cylinder heads 55 by the flexible conduits 121 and 122 respectively. The members 96 of the valves 81 and 82 are connected with the threaded apertures of the cylinder heads 48 by the flexible conduits 123 and 124 respectively. The members 96 of the valves 83 and 84 are connected with the threaded apertures of the cylinder heads 63 by the flexible conduits 125 and 126 respectively. The members 96 of the valves 85 and 86 are connected with the threaded apertures of the cylinder heads 72 by the flexible conduits 127 and 128 respectively. The members 98 of the valves 79 and 80 are connected with the threaded apertures of the cylinder heads 53 by the flexible conduits 129 and 130 respectively. The members 98 of the valves 81 and 82 are connected with the threaded apertures of the cylinder heads 52 by the flexible conduits 131 and 132 respectively. The members 98 of the valves 83 and 84 are connected with the threaded apertures of the cylinder heads 67 by the flexible conduits 133 and 134 respectively. The members 98 of the valves 85 and 86 are connected with the threaded apertures of the cylinder heads 68 by the flexible conduits 135 and 136 respectively. The conduit 137 is connected with the upper portion of the storage tank D, and is also connected with the members 92 of the valves by conduits 138.

The operation of my invention is substantially as follows: Coal slack, or the like, is admitted into the rear end of the mixer 25 through the feed pipe H from a bin or other suitable container. Pulverized binding compound is admitted into the mixer 25 from the hopper 33 through a slot formed by adjusting the slide 33', and water is admitted into the mixer 25 through perforations in the pipe I, the volume of water being admitted is controlled by the valve I'.

The electric motor A drives the air compressor B by means of the belt C, and thereby forces compressed air into the storage tank D through the conduit E. The compressed air is then admitted, through the conduits 137 and 138 respectively, to the passages 91 of the valves, and then into the space formed by the caps 108.

The electric motor A, rotating its shaft, and said shaft being secured to the flanged coupling G, rotates the horizontal shaft of the reduction unit F, and the reduction unit in turn rotates the vertically extending shaft 26. The vertically extending shaft 26 rotates the worm gear in the reduction unit 27, and the worm gear rotates the worm wheel which is secured to the rear portion of the horizontal mixer shaft 30, and thereby rotates the mixer blades 31 in the mixer 25.

As the coal slack, or the like, is admitted from the feed pipe H into the mixer 25 it is carried forwardly by the rotating blades 31. The pulverized binding compound enters the mixer 25 from the hopper 33, and is mixed with the coal slack. As this mixture is being carried forwardly, water is admitted into the mixer from the pipe I and is mixed therewith, and as the mixture continues to be carried forwardly through the mixer 25, the coal slack, binding mineral, and water become thoroughly mixed. The mixture is carried to the forward end of the mixer 25 from where it enters the hopper 34.

The aperture 38ᵃ, of the member 38, registers with the lower opening of the hopper 34, as shown in Figure 13, and becomes filled with the mixture from the hopper 34. When the member 38 is in the position as shown in Figure 13, the plungers 41 are in the position as shown in Figure 13 also. Likewise, the pistons of the vertical and horizontal compound cylinders are in the positions as shown in Figures 11 and 12 respectively.

The shaft 116, being connected at its rear end to the coupling 115, is rotated by the motor K through the coupling M and the reduction unit L. The miter gears 119, being secured to the shaft 116 and rotated thereby, mesh with their respective miter gears 103. The miter gears 103 being secured to their respective shafts 99 by means of the pins or rivets 102, rotate said shafts 99, which in turn, rotate the discs 104 by means of the outwardly projecting pins 100. The positions of the apertures 105 of the discs 104, with relation to each other, are predetermined, and the discs are rotated synchronously, thereby causing the compound cylinders to operate the members 38 and 41 to predetermined positions.

Assuming that the machine is in operation, the members 38 and 41 being in the positions as shown in Figure 13, and the compound cylinders being in the positions as shown in Figures 11 and 12, the discs 104 of the valves 83 and 84 rotate, bringing the apertures 105 into register with their respective passages 97, thereby permitting compressed air from the respective conduits 138 to pass therethrough and into the passages 97, and into the respective flexible conduits 133 and 134. At substantially the same time that the apertures 105 come into register with the passages 97, the respective apertures 106 come into register with the respective passages 95. The compressed air, being forced through the flexible conduits 133 and 134, enters the respective apertures 67', of the cylinder heads 67, and passing therethrough into the cylinders 64, forces the piston rods 62 forwardly. As the pistons move forwardly, the air which was in the forward ends of the cylinders 64 is forced outwardly through the apertures 63', of the cylinder heads 63, through the flexible conduits 125 and 126, through the passages 95 and upwardly into the apertures 106 of the valves 83 and 84 respectively, thence downwardly through the apertures 88' and outwardly through the passages 93. As the pistons are forced forwardly, they being secured to the member 38, force the said member 38 forwardly to the predetermined position as shown in Figure 14, the portion 38' of the member 38 coming in contact with the previously formed coal cubes X, and sliding them forwardly from the upper surfaces of the members 41.

After the apertures 105 and 106, of the valves 83 and 84, have rotated out of register with their respective passages 97 and 95, the apertures 105 and 106, of the valves 81 and 82 rotate into register with their respective passages 95 and 97, the apertures 105 permitting compressed air from the respective conduits 138 to pass therethrough and into the passages 95, thence into the flexible conduits 123 and 124. The compressed air, being forced through the flexible conduits 123 and 124, enters the respective apertures 48', of the cylinder heads 48, passing therethrough and into the cylinders 51, and forcing the pistons downwardly. As the pistons move downwardly, the air which was contained in the lower portion of the cylinders 51 is forced outwardly through the apertures 52' of the cylinder heads 52, through the respective flexible conduits 131 and 132, through the respective passages 97, and upwardly into the apertures 106 of the valves 81 and 82 respectively, thence downwardly through the apertures 88' and outwardly through the passages 93. As the pistons are forced downwardly, they being secured by the piston rods 47 through the movable channel-shaped member 45, cause the plungers 41 to move downwardly to the predetermined position as shown in Figure 15.

After the apertures 105 and 106, of the valves 81 and 82 have rotated out of register with their respective passages 95 and 97, the apertures 105 and 106 of the valves 85 and 86 rotate into register with their respective passages 97 and 95, the respective apertures 105 permitting compressed air from the respective conduits 138 to pass therethrough and into the passages 97, thence into the flexible conduits 135 and 136. The compressed air, being forced through the flexible conduits 135 and 136, enters the respective apertures 68', of the cylinder heads 68, passing therethrough and into the cylinders 71, forcing the horizontal cylinders forwardly, said horizontal cylinders being slidably mounted on the piston rods 73 which are secured at their rear ends through the stationary channel-shaped member 76. As the horizontal cylinders move forwardly, the air which was contained in the rear portions of the cylinders 71 is forced outwardly through the apertures 72', of the cylinder heads 72, through the respective flexible conduits 127 and 128, through the respective passages 95, and upwardly into the apertures 106 of the valves 85 and 86 respectively, thence downwardly through the apertures 88' and outwardly through the passages 93. As the horizontal cylinders are forced forwardly, they being secured, by the forward ends of the piston rods 62, through the portion 38'' of the member 38, force the member 38 forwardly to the predetermined position as shown in Figure 16. When the member 38 stops at the predetermined position, as shown in Figure 16, the aperture 38ª is in register with the apertures 37' of the member 37, and the mixture contained in the aperture 38ª falls into the apertures 37', as shown in Figure 16.

After the apertures 105 and 106, of the valves 85 and 86, have rotated out of register with their respective passages 97 and 95, the apertures 105 and 106 of the valves 79 and 80 rotate into register with their respective passages 95 and 97, the respective apertures 105 permitting compressed air from the respective conduits 138 to pass therethrough and into the passages 95, thence into the flexible conduits 121 and 122. The compressed air, being forced through the flexible conduits 121 and 122, enters the respective apertures 55' of the cylinder heads 55, passing therethrough and into the cylinders 54, forcing the vertical cylinders downwardly, said vertical cylinders being slidably mounted on the piston rods 49 which are secured at their lower ends through the stationary channel-shaped member 46. As the vertical cylinders move downwardly, the air which was contained in the upper portions of the cylinders 54 is forced outwardly through the apertures 53' of the cylinder heads 53, through the respective flexible conduits 129 and 130, through the respective passages 97, and upwardly into the apertures 106 of the valves 79 and 80 respectively, thence downwardly through the apertures 88' and outwardly through the passages 93. As the vertical cylinders are forced downwardly, they being secured to the channel-shaped member 45 by the upper ends of the piston rods 47, cause the plungers 41 to move downwardly to the predetermined position as shown in Figure 17.

After the apertures 105 and 106, of the valves 79 and 80, have rotated out of register with their respective passages 95 and 97, the apertures 105 and 106 of the valves 85 and 86 rotate into register with their respective passages 95 and 97, the respective apertures 105 permitting compressed air from the respective conduits 138 to pass therethrough and into the passages 95, thence into the flexible conduits 127 and 128. The compressed air, being forced through the flexible conduits 127 and 128, enters the respective apertures 72', of the cylinder heads 72, passing therethrough and into the cylinders 71, forcing the horizontal cylinders rearwardly, said horizontal cylinders being slidably mounted on the piston rods 73 which are secured at their rear ends through the stationary channel-shaped member 76. As the horizontal cylinders move rearwardly, the air which was contained in the forward portions of the cylinders 71 is forced outwardly through the apertures 68', of the cylinder heads 68, through the flexible conduits 135 and 136, through the respective passages 97, and upwardly into the apertures 106 of the valves 85 and 86 respectively, thence downwardly through the apertures 88' and outwardly through the passages 93. As the horizontal cylinders are forced rearwardly, they being secured by the forward ends of the piston rods 62 to the portion 38'' of the member 38, causing the member 38 to move rearwardly to the predetermined position as shown in Figure 18.

After the apertures 105 and 106, of the valves 85 and 86, rotate out of register with their respective passages 95 and 97, the apertures 105 and 106 of the valves 81 and 82 rotate into register with their respective passages 97 and 95, the respective apertures 105 permitting compressed air from the respective conduits to pass therethrough and into the passages 97, thence into the flexible conduits 131 and 132. The compressed air, being forced through the flexible conduits 131 and 132, enters the respective apertures 52', of the cylinder heads 52, passing therethrough and into the cylinders 51, forcing the vertical piston rods 47 upwardly, said piston rods 47 being secured through the movable channel-shaped member 45, and causing the plungers 41 to move upwardly, as shown in Figure 19, and compressing the mixture contained in the apertures 37' between the bottom surface of the member 38 and the upper surfaces of the plungers 41. As the piston rods 47 move upwardly, the air which was contained in the upper portions of the cylinders 51 is forced outwardly through the apertures 48' of the cylinder heads 48, through the flexible conduits 123 and 124, through the respective passages 95, and upwardly into the apertures 106 of the valves 81 and 82 respectively, thence downwardly through the apertures 88' and outwardly through the passages 93.

After the apertures 105 and 106, of the valves 81 and 82, have rotated out of register with their respective passages 97 and 95, the apertures 105 and 106 of the valves 83 and 84 rotate into register with their respective passages 95 and 97, the respective apertures 105 permitting compressed air from the respective conduits 138 to pass therethrough and into the passages 95, thence into the flexible conduits 125 and 126. The compressed air, being forced through the flexible conduits 125 and 126, enters the respective apertures 63' of the cylinder heads 63, passing therethrough, and into the cylinders 64, and forcing the horizontal piston rods rearwardly, said piston rods 62 being secured through the portion 38'' of the member 38, and causing the member 38 to move to the predetermined position as shown in Figure 20. As the piston rods 62 move rearwardly, the air which was contained in the rear portions of the cylinders 64 is forced outwardly through the apertures 67' of the cylinder heads 67, through the respective flexible conduits 133 and 134, through the respective passages 97, and upwardly into the apertures 106 of the valves 83 and 84 respectively, thence downwardly through the apertures 88', and outwardly through the passages 93.

After the apertures 105 and 106, of the valves 83 and 84, have rotated out of register with their respective passages 95 and 97, the apertures 105 and 106, of the valves 79 and 80, rotate into register with their repective passages 97 and 95, the respective apertures 105 permitting compressed air from the respective conduits 138 to pass therethrough and into the passages 97, thence into the respective flexible conduits 129 and 130. The compressed air, being forced through the flexible conduits 129 and 130, enters the respective apertures 53' of the cylinder heads 53, passing therethrough and into the cylinders 54, forcing the vertical cylinders upwardly, said vertical cylinders being slidably mounted on the piston rods 49 which are secured at their lower ends through the stationary channel-shaped member 46. As the vertical cylinders move upwardly, the air which was contained in the lower portions of the cylinders 54 is forced outwardly through the apertures 55', of the cylinder heads 55, through the respective flexible conduits 121 and 122, through the respective passages 95, and upwardly into the apertures 106 of the valves 79 and 80 respectively, thence downwardly through the apertures 88', and outwardly through the passages 93. As the vertical cylinders move upwardly, they being secured by the upper ends of the piston rods 47, through the movable channel-shaped member 45, cause the plungers 41 to move upwardly to the position as shown in Figure 21.

The above description of the operations of the various members completes one complete revolution of my coal cubing mechanism.

It should be observed that in the continued operation of my coal cubing machine, the above cycle of operation is repeated, and the operations of the various parts are automatically controlled, after being started.

I desire that it be understood that my machine may be operated by liquid as well and efficiently as with air, the only changes necessary being the replacement of the air compressing unit with a liquid pump.

I also desire that it be understood that minor changes may be made in the several details, and in the arrangement of the parts herein shown and described, without departing from the spirit of my invention or sacrificing any of the advantages thereof which are new and useful, and which involve invention.

Having now fully shown and described my invention, what I claim and desire to secure by Letters Patent of the United States, is—

1. A coal cubing machine comprising a frame, a mixer trough, a hopper positioned at one end of said mixer trough, a slidable mixture carrying member having a vertically disposed aperture formed therethrough, said mixture carrying member being positioned below said hopper and being horizontally slidable forwardly and rearwardly, a moulding member having a plurality of vertically disposed apertures therethrough, plungers slidably located in said vertically disposed apertures, means for imparting an intermittent sliding movement to the mixture carrying member, means for imparting an intermittent vertical movement to said slidable plungers, and means for automatically controlling the intermittent movements of the horizontally slidable mixture carrying member and the vertically slidable plungers.

2. In a coal cubing machine having a frame, the combination of a horizontally slidable member having a mixture carrying aperture formed vertically therethrough, said horizontally slidable member having a forwardly extending portion formed integral with the lower portion thereof, means for intermittently sliding said horizontally slidable member to predetermined positions, a stationary member having vertically disposed apertures formed therethrough the upper ends of which are adapted to be closed by the forwardly extending portion of the horizontally slidable member, slidable plungers located in the vertically disposed apertures of the stationary member, means for intermittently moving the plungers to predetermined positions, said means for controlling said intermittent movements comprising a plurality of cylinders each having slidable pistons located therein, each of said cylinders being slidably mounted on a second piston, and the piston rod of said second piston being secured to a stationary member of said frame.

3. In a coal cubing machine, the combination of a member having apertures formed therethrough and providing moulds therein, plungers adapted to slide vertically in said apertures, a second member adapted to slide forwardly and rearwardly on the first mentioned member, said second member having a vertically disposed aperture formed therethrough and having a vertically disposed portion formed integral with its forward edge and a downwardly disposed portion formed integral with its rear edge, and means provided to guide the second member in its forward and rearward movements.

4. In combination with a coal cubing machine having a mixing trough, a hopper adapted to receive material from one end of the mixing trough and having an elongated aperture in its lower portion, a horizontally slidable member, means for sliding said slidable member to predetermined positions, a member having a horizontally extending portion and a downwardly extending portion, said downwardly extending portion having a plurality of apertures formed therethrough, plungers adapted to move vertically within said apertures, means for moving said plungers to predetermined positions within said apertures, and means for controlling the sequence of the movements of the plungers and of the horizontally slidable member.

5. In combination with a coal cubing machine, compound cylinders adapted to impart an intermittent motion to vertically sliding plungers, each of said compound cylinders comprising a pair of cylinders held in clamped relation with each other, each having a head member at both ends thereof, each of said head members having an aperture formed therethrough and adapted to have a conduit secured thereto, one head member of each cylinder having an aperture formed therethrough for the reception of a slidable piston rod, said piston rod of one cylinder being oppositely disposed with relation to the piston rod of the other cylinder, one of said piston rods being indirectly connected with movable plungers at its outer end, the other piston rod secured to a stationary member of the frame, the first piston rod being adapted to slide inwardly and outwardly with relation to its respective cylinder and the second single cylinder being adapted to slide on its respective piston rod, and means for automatically controlling the motions of the piston and cylinders.

6. In combination with a coal cubing machine having a frame, a horizontally slidable member slidably located therein, compound cylinders adapted to impart an intermittent motion to said horizontally slidable member, each of said compound cylinders comprising a pair of cylinders having a pair of cylinder heads secured thereon, each of said cylinder heads having an aperture formed therethrough and adapted to have a conduit secured thereinto, one cylinder head of each pair having an aperture formed therethrough and adapted to receive a piston rod, said piston rods being oppositely disposed with relation to each other, one of said piston rods being secured to the horizontally slidable member, the other piston rod being secured to a stationary member of the frame, the first piston rod being adapted to slide inwardly and outwardly with relation to its respective cylinder, the second cylinder being adapted to slide on its respective piston rod, and means for automatically controlling the motions of the pistons and cylinders, all substantially as shown and described.

7. In a coal cubing machine, means for controlling the movements of the cube forming members thereof, said means comprising a plurality of compound cylinders, each of said compound cylinders comprising a pair of cylinders having head members secured thereon, each of said cylinders having a piston with a piston rod secured thereto, said piston rods being oppositely disposed with relation to each other and the outer end of each piston rod extending outwardly through a respective cylinder head, the outer end of one piston rod being secured to a movable cube forming member and the outer end of the oppositely disposed piston rod being secured to a stationary frame member, all substantially as shown and described.

DANIEL A. ROW.